3,052,819
FAST DISCHARGE DEVICE
Mitchell H. Dazey, Palos Verdes Estates, Calif., assignor to Space Technology Laboratories, Inc., Los Angeles, Calif., a corporation of Delaware
Filed Dec. 12, 1960, Ser. No. 75,277
12 Claims. (Cl. 315—242)

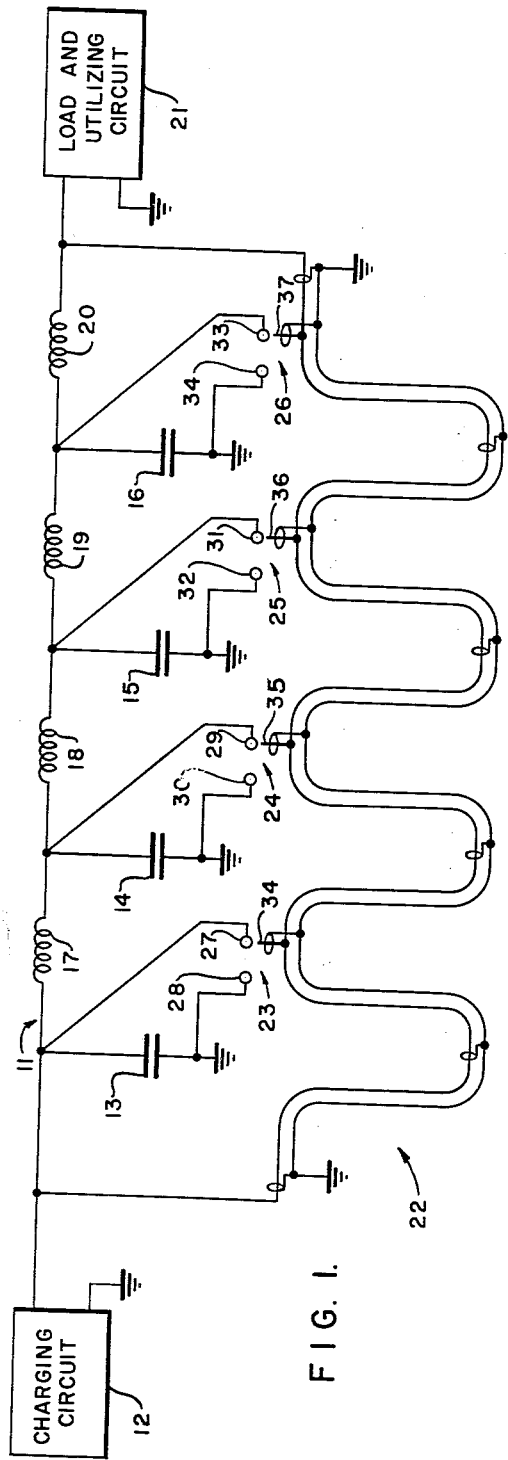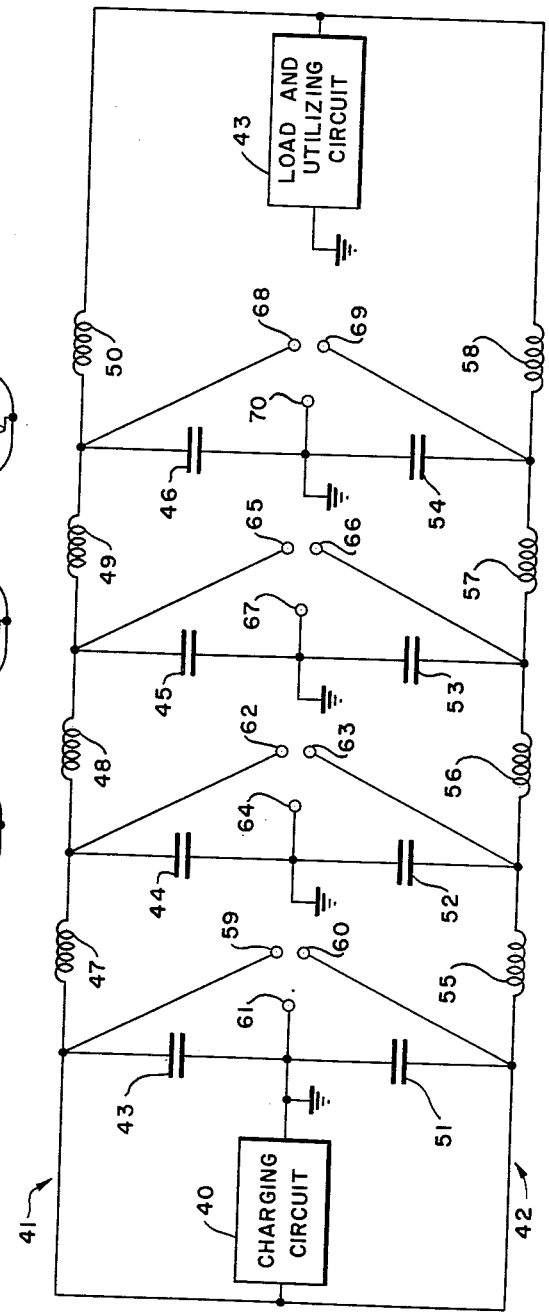

This invention relates to high voltage protection circuits and more particularly to a fast discharge device for protecting high energy capacitor storage banks used in pulse forming lines.

In studies of pulsed processes of short duration, great effort has been concentrated on producing powerful pulsed discharges in deuterium at low pressure. The problem is to obtain a high temperature and a high density in a compressed plasma column over a short period of time. Investigations of pulsed discharges having a very high rate of current buildup, for example from $10^{10}$ to $10^{11}$ amps. per second, are needed in order to study the acceleration of plasma by electrodynamic forces. These large electrodynamic forces have been used, for example, in efforts to control deuterium plasma by attempting to pinch the plasma in towards the axis of the discharge tube. These experiments indicate the need for greater electrodynamic forces than at present can be generated only by pulsed discharge techniques in which energy is stored in banks of capacitors. A typical energy storage capacitor may store 1700 joules at 20,000 volts. At the present time systems capable of storing a total energy of approximately $10^6$ joules is contemplated and would require approximately 600 capacitors of the type just described. Due to the large amount of energy being stored, it is necessary to design the individual capacitor to store as many joules per unit volume as the dielectric strength will allow. As a result, insulating materials are usually stressed to their maximum allowable limit, which increases the probability of a fault occurring in the capacitor bank.

Should a fault occur, it is possible that the faulted capacitor may dissipate a large percentage of the energy available in the capacitor bank due to the resistive nature of the fault. The high currents passed by the resistive fault dissipates the energy in the form of heat due to the $I^2R$ loss. The heat very quickly exceeds the melting point of the faulted material which is vaporized and confined within the capacitor. The pressures built up within a faulted capacitor can and do reach explosive proportions. As a result, a faulted capacitor can create a large disturbance that would destroy not only the faulted capacitor, but also other capacitors and equipment in the area.

Pulse discharge techniques using only capacitors unfortunately are capable of producing only a sine wave of voltage and current. The sine wave current waveform by definition produces a peak value at only one point in time thereby severely limiting any experiment requiring a sustained peak value of current.

In an effort to reach sustained large values of current pulses, it has been found desirable to use transmission lines as a means of generating a substantially square wave of current. The technique for protecting the individual capacitor banks forming part of a pulse forming line is the subject matter of the present invention. The design of transmission lines for producing the desired amplitudes of voltage or current waveforms is well known. The problem of protecting these lines from faults still exists due to the large absolute values of electrical quantities of the substantially long pulse widths used. At the present time pulse widths of 10 microseconds are used, and those of over 1,000 microseconds are contemplated. In high voltage transmission line systems of the order of 100,000 volts, it is entirely feasible and possible to obtain absolute values of current approximating 100,000 amperes or greater if the characteristic impedance of the transmission line is made approximately one ohm or less. Conventional design techniques over the parameters of L, R, and C will enable a designer to obtain any characteristic impedance that is desired. The absolute values of voltage and current and time width of the signal generated are also a function of the same L, C, and R parameters, and the allowable dielectric stress.

In the present invention, there is described and illustrated two embodiments of the invention in which high capacity transmission lines are protected from faults developed within the line itself. In the first embodiment, a high capacity transmission line having a substantially low characteristic impedance of the order of one ohm is used as the main line for generating the desired signal. A second transmission line having a substantially higher impedance, for example of the order of 50 ohms, is used as a protection circuit for the main line. The high voltage points on the main line which are to be protected are each connected to an individual arc gap separating the high voltage and ground. A trigger probe located on each arc gap is connected to an equal voltage point on the high impedance transmission line. Since the voltage to ground on the second high impedance transmission line corresponds to the voltage to ground on the main transmission line and since the voltage waveform on both transmission lines are the same at any given time, the high voltage sides of each arc gap will be at the same potential. Should the waveform differ at any time in any part of the transmission line, a voltage will appear on the trigger portion on that particular arc gap causing a local discharge. The presence of the discharge at the trigger will cause the arc gap to fire, thereby establishing an external discharge path for dissipating the energy in the line and in a manner that will not cause further damage. In addition, the unbalance in the main line due to the arc gap discharging will cause many of the other gaps to fire and at different times, thereby effectively dissipating the energy over many gaps rather than concentrating the discharge at a single point as in a fuzed system.

A second embodiment is disclosed in which the second transmission line is made substantially equal to the first transmission line and together both lines furnish the desired signal in equal proportions. This is achieved by having substantially identical parameters in each line which includes having equal characteristic impedances for both lines. The second line is not used strictly as a protection circuit, but rather as a main source of voltage and current. The arc gap configurations are functionally similar to those disclosed in connection with the first embodiment with the exception that the defined trigger probe now has the same capacity as the regular arc gap. The effect of a trigger probe may be achieved, for example, by placing the three terminal arc gaps in an isosceles triangle configuration with the ground terminal as the apex and each based terminal connected to similar positions on each line. The base terminals will have identical high voltages with respect to ground and by definition, therefore, will be at at the same potential with respect to each other. Since the voltages are equal, the terminals may be placed substantially close to each other without fear of breakdown during normal operation. However, by physically placing these base terminals close to each other, each one in effect will act as a trigger probe for the other, depending, of course, on which line the fault occurs. Should a fault occur, the initial discharge will occur between the high voltage terminals, thereby causing a local discharge that will cause the main arc gap to fire. As mentioned previously, discharging any of the arc gaps will provide the necessary external discharge path for discharging the energy in the line. In the second embodiment, the economics of the initial installation is substantially improved, since both lines are operating at full capacity and efficiency, and in effect each line is protecting the other with a minimum of external equipment.

Further objects and advantages will be made more apparent as the description progresses, reference now being made to the accompanying drawings wherein:

FIG. 1 illustrates a low impedance main transmission line being protected by a high impedance protection transmission line; and FIG. 2 illustrates a pair of substantially equal low impedance lines protecting each other.

Referring now to FIG. 1, there is shown a conventional high voltage, high current transmission line 11 being charged by a suitable charging circuit 12. The transmission line 11 normally consists of a plurality of capacitors connected together to form capacitor banks as illustrated at 13, 14, 15, and 16. The individual capacitor banks are interconnected by means of suitable inductances 17, 18, 19, and 20 to form the necessary parameters of the transmission line 11 needed to produce the desired voltage and current waveforms. The output of the transmission line 11 is connected to a suitable load and utilizing circuit 21. It is known that operating capacitor banks 13, 14, 15, and 16 at 100,000 volts and that by properly designing the parameters of the transmission line 11, a line having a characteristic impedance of substantially one ohm or less can be produced that will be capable of delivering a short circuit current of at least 100,000 amperes. It will be readily apparent that should a fault develop in any of capacitor banks 13, 14, 15, or 16, the stored energy will attempt to dissipate itself through the fault, which would not only unbalance the line but result in the stored energy contained in the other capacitor banks being discharged through the fault with disastrous results. This problem is solved by means of the first embodiment of the present invention.

A second transmission line 22, preferably charged from the same charging circuit 12, is connected to the same load and utilizing circuit 21 or to a separate but similar load and utilizing circuit. Transmission line 22 may be constructed from any material, but preferably from a distributed constant type line, such as a coaxial line. The current passed by transmission line 22 may be kept to a minimum by selecting a line having a substantially higher characteristic impedance than that of transmission line 11, which may approach 50 ohms, as compared to the characteristic impedance of transmission line 11, which may be only one ohm. Transmission line 22 must, of course, have the same voltage characteristic and handling properties as that of transmission line 11, since it is important for the proper operation of the system that identical waveforms of voltage be produced in both lines. The higher characteristic impedance of transmission line 22 will keep the initial cost of the line low compared to the cost of transmission line 11, and, in addition, the total short circuit current for the transmission line 21 will not exceed 2,000 amperes at 100,000 volts. Sufficient lengths of transmission line 21 are used in order to duplicate completely the voltage waveform appearing at selected parts of the transmission line 11. Since the energy is stored in the capacitor banks, it is expected that each capacitor bank will be protected against a fault occurring within any of the capacitors comprising that bank. For large size capacitors it may well be necessary to provide protection for each capacitor, as well as providing protection for the bank of capacitors. For the example illustrated, it is assumed that each capacitor bank 13, 14, 15, and 16 will be protected. Each bank of capacitors therefore is connected in parallel with a suitable arc gap, and preferably of the sphere-type discharge gaps illustrated at 23, 24, 25, and 26. Capacitor bank 13 is protected by having a first terminal 27 connected to the high voltage side of said capacitor bank and a second terminal 28 connected to the low voltage or ground side. In a similar manner, capacitor banks 14, 15, and 16 are each protected by gap 24 comprising terminals 29 and 30, arc gap 25 comprising terminals 31 and 32, and arc gap 26 comprising terminals 33 and 34. As mentioned previously, transmission line 22 is arranged to duplicate the voltage waveform appearing on transmission line 11. A point is determined on coaxial cable 22 that develops the same voltage waveform and at the same time as the voltage waveform appears at terminal 26. This point is connected to a trigger probe 34 of arc gap 23. In a similar manner, additional points are located on coaxial line 22 such that a trigger probe 35 of arc gap 24 will have the same potential to ground as that appearing on terminal 29. Similarly, arc gap 25 will have a trigger probe 36 and arc gap 26 will have a trigger probe 37, each having a voltage that is substantially equal to the voltage appearing on the corresponding terminal connected to the main transmission line 11.

In the normal course of events charging circuit 12 will charge transmission line 11 and transmission line 22 to the designed operating potentials. Energy is drawn from the transmission line by loading the circuit by means of the load and utilizing circuit 21. In the preferred embodiment both transmission lines 11 and 22 will discharge into the same load in the normal manner. Since each of the arc gaps 23, 24, 25, and 26 is designed to handle the maximum voltage to ground appearing across the main terminals, there will be no breakdown or arcing unless a fault should occur anywhere in the circuit.

Consider now the condition in which a fault occurs, for example anywhere in capacitor bank 14. It will be appreciated that the potential appearing across terminals 29 and 30 and that appearing across trigger probe 35 and terminal 30 will no longer be identical. As a result of this difference in potential, a local discharging will occur, thereby causing the arc gap between terminals 29 and 30 to fire, which immediately provides an external discharge path for dissipating the energy in the faulted capacitor bank 14. In addition, the unbalance caused by the firing of arc gap 24 will substantially disrupt the balanced conditions existing elsewhere on the transmission line 11, thereby resulting in potential differences occurring on many of the other arc gaps. This in turn will cause triggering voltages to occur and other arc gaps to fire at various times as the current and voltage pulse moves down the transmission line 11.

Referring now to FIG. 2, there is shown a second embodiment of this invention illustrating how two substantially identical and equal lines may be interconnected so as to afford protection against damaging effects of a fault occurring in either of said lines. There is shown a charging circuit 40 connected in circuit with a pair of substantially identical transmission lines 41 and 42. Each transmission line 41 and 42 may have energy capacities as described for transmission line 11 illustrated in FIG. 1. It is expected, therefore, that both transmission lines 41 and 42 will have substantially low characteristic impedances of the order of one ohm or less each. The outputs of both transmission lines are connected in a conventional manner to a load and utilizing circuit 43. Transmission line 41 comprises a plurality of capacitor banks 43, 44, 45, and 46 connected in circuit with a plurality of inductances 47, 48, 49, and 50 to define the low characteristic impedance. In a similar manner, transmission line 42 consists of capacitor banks 51, 52, 53, and 54 and inductances 55, 56, 57, and 58 similar to those appearing in line 41. It is essential for the proper operation of this system that the voltage waveform propagated on each of the transmission lines 41 and 42 be the same at all times. This, of course, is a design criteria and is handled by selecting the proper L, C, and R parameters defining each transmission line. Corresponding points on each transmission line, for example from the high voltage end of capacitor 43 on transmission line 41 and the high voltage end of capacitor 51 on transmission line 42, are connected, respectively, to metal spheres 59 and 60 so as to define a small arc gap. A third metal sphere 61 is connected to ground and is located in spaced relationship with respect to spheres 59 and 60 as determined by the maximum voltage appearing across either capacitors 43 or 51. In a similar manner, capacitor banks 44 and 52 are protected by spheres 62, 63, and 64. Capacitor banks 45 and 53, and 46 and 54, are similarly protected, respectively, by spheres 65, 66, and 67, and spheres 68, 69, and 70.

The principle of operation is basically the same as that described in connection with the embodiment illustrated in FIG. 1. If, for example, a fault should develop in capacitor bank 44, the voltage appearing across spheres 62 and 64 and that appearing across spheres 63 and 64 will be different. As a result of this voltage difference between spheres 62 and 63 and the substantially close physical proximity of said spheres to each other, a local discharge will occur. The presence of a local discharge between spheres 62 and 63 will cause the main gap to fire, thereby establishing an external discharge path for dissipating the energy in the lines and in a manner that will not cause further damage. The presence of a discharge at any individual gap will immediately cause unbalanced transient conditions to appear elsewhere on the line which will affect the other gaps causing them to trigger and fire in a manner just explained. The advantage of having the total energy dissipated over many gaps rather than at one single concentrated point allows the transmission lines to be used and operated in a substantially safe manner.

The advantages of both embodiments will be further appreciated when it is realized that the operation is not critical as compared with a fuze, which must be insensitive to a normal surge and sensitive to a false surge. In addition, energy dissipation is spread over many gaps rather than concentrated as in a single fuze. Since arc gaps are used, the system is self-clearing and replacement of parts or resetting of devices such as fuze or circuit breakers is eliminated. In addition, the discharge from each capacitor is not limited by inductance such as would be added by installing a fuze.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined in the appended claims.

What is claimed is:

1. In combination, a first transmission line for generating a traveling wave, a second transmission line for generating a substantially identical traveling wave, said first and second transmission lines having locations with similar voltage characteristics, means for detecting voltage differences at said locations between said traveling waves generated by said first transmission line and said second transmission line, and means responsive to said voltage differences for discharging said transmission lines.

2. In combination, a first pulse forming means for generating a substantially square wave, a second pulse forming means for generating a substantially identical square wave as generated by said first pulse forming means, said first and second transmission lines having locations with similar voltage characteristics, means for detecting voltage differences at said locations between said first and second square waves, and means responsive to said voltage differences for discharging said traveling wave means.

3. In combination, a first transmission line for generating a first current pulse, a second transmission line for generating a second substantially identical current pulse, said first and second transmission lines having locations with similar voltage characteristics generated by said current pulses, ground discharge means interconnecting said lines for detecting voltage differences at said locations between said first and second pulses generated by each line, and means responsive to said voltage differences for energizing said ground discharge means whereby said transmission lines are discharged.

4. In combination, a first transmission line for generating a first current pulse, a second transmission line for generating a second substantially identical current pulse, said first and second transmission lines having locations with similar voltage characteristics generated by said current pulse, a plurality of arc gaps forming pairs, each pair of arc gaps being connected across said similar voltage locations to ground across each transmission line, means for generating a first arc between a pair of said arc gaps in the presence of a voltage difference between said lines, and means responsive to said first arc for generating a second arc to ground whereby said transmission lines are discharged.

5. In a main transmission line system for generating substantially a square waveform of current, a system for protecting said main transmission lines against a fault developing in any of said capacitor banks comprising an auxiliary transmission line for generating a substantially identical current waveform as generated by said main transmission line, said first and second transmission lines having locations with similar voltage characteristics generated by said current pulses, means for detecting voltage differences at said locations existing between said main line and said second line at any given time, and means responsive to said voltage difference for discharging said main transmission line.

6. In combination, a plurality of transmission lines each arranged to deliver substantially large values of current, means for connecting arc gaps to ground across similar voltage portions on each transmission line whereby the voltage developed across each transmission line to ground for each arc gap is the same, means for locating each of said arc gaps in a spacial relationship for generating a first arc between each of said arc gaps in the presence of a voltage difference between said transmission lines, and means responsive to said first arc gap for generating a second arc to ground whereby said transmission lines are discharged.

7. In combination, a first and second transmission line each arranged to develop substantially identical voltage waveforms and current in parts of said lines, means for locating terminals defining a first arc gap across a portion of said first transmission line developing a first voltage, means for locating terminals defining a second arc gap across a portion of said second transmission line developing substantially the same voltage and at the same time as said first voltage is developed across said first transmission line, means responsive to a voltage difference between said first arc gap and said second arc gap for generating a local discharge between said arc gaps, and means responsive to said local discharge for firing said arc gaps whereby said transmission lines are discharged.

8. In combination, a first and second transmission line each arranged to develop substantially identical voltage waveforms and current in parts of said lines, means for charging said first and second transmission lines from a single charging circuit, means for locating terminals defining a first arc gap across a portion of said first transmission line defining a first voltage, means for locating terminals defining a second arc gap across a portion of said second transmission line developing substantially the same voltage and at the same time as said first voltage is developed across said first transmission line, means for simultaneously discharging said first and second transmission lines, means responsive to a voltage difference between said first arc gap and said second arc gap for generating a local discharge between said arc gaps, and means responsive to said local discharge for firing said arc gaps whereby said transmission lines are discharged.

9. In combination, a first and second transmission line each arranged to develop substantially identical voltage and current waveforms in parts of said lines, said first and second transmission lines being substantially identical, means for locating terminals defining a first arc gap across a portion of said first transmission line developing a first voltage, means for locating terminals defining a second arc gap across a portion of said second transmission line developing substantially the same voltage and at the same time as said first voltage is developed across said first transmission line, means responsive to a voltage difference between said first arc gap and said second arc gap for generating a local discharge between said arc gaps, and means responsive to said local discharge for firing said arc gaps whereby said transmission lines are discharged.

10. In combination, a protection circuit comprising a plurality of capacitors connected in circuit to form a first transmission line having a substantially low characteristic impedance, a second transmission line having a substantially higher characteristic impedance than said first transmission line, said second transmission line being arranged to duplicate the voltage waveform appearing at a plurality of selected locations on said first transmission line, a plurality of arc gaps each comprising a first terminal connected to a common ground connection, a second terminal connected to a selected location on the high voltage side of said first transmission line, and a third terminal connected to a point of high voltage on said second transmission line, said voltage across said first and second terminals being substantially equal at all times to the voltage across said first and third terminals, means for generating a local discharge between said second and third terminals in the presence of a voltage difference, and means responsive to said local discharge for causing a discharge between said first and second terminals whereby said first transmission line is discharged.

11. A protection circuit comprising a plurality of capacitors connected together to form a capacitor bank, a plurality of capacitor banks connected in circuit to form a first transmission line having a substantially low characteristic impedance, a second transmission line having a substantially higher characteristic impedance than said first transmission line, said second transmission line being arranged to duplicate the voltage waveform appearing on said first transmission line, a plurality of arc gaps each comprising a first terminal connected to a common ground connection, a second terminal connected to a selected location on the high voltage side of said first transmission line, and a third terminal connected to a point of high voltage on said second transmission line, said voltage across said first and second terminals being substantially equal at all times to the voltage across said first and third terminals, means for generating a local discharge between said second and third terminals in the presence of a voltage difference, and means responsive to said local discharge for causing a discharge between said first and second terminals whereby said first transmission line is discharged.

12. A protection circuit comprising a plurality of capacitors connected in circuit to form a first transmission line having a substantially low characteristic impedance, a second transmission line having a substantially higher characteristic impedance than said first transmission line, a plurality of arc gaps each being connected across different points of said first transmission line, each of said arc gaps having a triggering element connecting said second transmission line at a voltage that is substantially equal to the voltage across said first transmission line, means for detecting a voltage difference between said similar voltage points on said first line and said second line, and means responsive to said voltage difference for discharging said transmission lines.

References Cited in the file of this patent
UNITED STATES PATENTS

| | | |
|---|---|---|
| 950,257 | Eisenstein | Feb. 22, 1910 |
| 1,574,473 | Elliott | Feb. 23, 1926 |
| 2,790,935 | Lautenberger | Apr. 30, 1957 |